(12) United States Patent
Nakayama et al.

(10) Patent No.: US 7,642,685 B2
(45) Date of Patent: Jan. 5, 2010

(54) INDUCTION MACHINE

(75) Inventors: Misa Nakayama, Tokyo (JP); Kouki Naka, Tokyo (JP); Masao Morita, Tokyo (JP); Masaya Inoue, Tokyo (JP); Akihiro Shimada, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 34 days.

(21) Appl. No.: 11/355,899

(22) Filed: Feb. 17, 2006

(65) Prior Publication Data
US 2006/0192457 A1   Aug. 31, 2006

(30) Foreign Application Priority Data

Feb. 22, 2005   (JP) ............................. 2005-045082
Jan. 13, 2006   (JP) ............................. 2006-006093

(51) Int. Cl.
*H02K 17/00*   (2006.01)
(52) U.S. Cl. ..................................... 310/211
(58) Field of Classification Search ................. 310/211, 310/180, 216, 254
See application file for complete search history.

(56) References Cited

U.S. PATENT DOCUMENTS

| | | | | |
|---|---|---|---|---|
| 3,594,595 A | * | 7/1971 | Williams et al. | ............. 310/168 |
| 4,761,602 A | * | 8/1988 | Leibovich | .................... 318/816 |
| 4,868,438 A | * | 9/1989 | Okamoto et al. | ............ 310/166 |
| 6,034,460 A | * | 3/2000 | Tajima et al. | ................ 310/179 |
| 6,815,863 B1 | | 11/2004 | Jack et al. | |
| 6,849,985 B2 | | 2/2005 | Jack et al. | |
| 2004/0004408 A1 | * | 1/2004 | Yamazaki et al. | ........... 310/184 |

FOREIGN PATENT DOCUMENTS

| | | |
|---|---|---|
| CN | 87102564 A | 10/1987 |
| CN | 1455498 A | 11/2003 |
| JP | 62-233048 | 10/1987 |
| JP | 298578 | 11/1995 |
| JP | 2000-253633 | 9/2000 |
| WO | WO 99/54985 | 10/1999 |
| WO | WO 01/48890 A1 | 7/2001 |

\* cited by examiner

*Primary Examiner*—Nguyen N Hanh
(74) *Attorney, Agent, or Firm*—Oblon, Spivak, McClelland, Maier & Neustadt, L.L.P.

(57) ABSTRACT

An electric rotating machine comprises: a stator in which a coil is wound on a plurality of teeth in concentrated winding, and the coil is connected to a three-phase power supply; and a rotor disposed in opposition to the teeth of the stator; wherein a ratio between the number of poles and the number of slots of the stator is 1:3. There is no higher harmonics of magnetomotive force in low order close to fundamental wave, thus enabling efficient operation of the electric rotating machine. Furthermore, owing to the stator of concentrated winding, it is possible to provide an electric rotating machine of high productivity with small coil end, high mass production, and high space factor.

10 Claims, 7 Drawing Sheets

AN ELECTRICAL ANGLE OF $(72 \times n)°$

AN ELECTRICAL ANGLE OF $72°$

INDUCTION MACHINE

BACKGROUND OF THE INVENTION

1. Field of the Invention

The present invention relates to an electric rotating machine and, more particularly, to an electric rotating machine including a stator to which concentrated winding is applied.

2. Description of the Related Art

Conventionally, in stators of a three-phase induction motor, distributed winding has been applied. On the other hand, in permanent magnet-type motors, stators to which concentrated winding is applied are often employed. A large difference between a concentrated winding stator and a distributed winding stator is that in the concentrated winding stator, there is a negative-phase magnetic flux (running in a direction opposite to a rotational direction) in frequency close to fundamental wave in a magnetomotive force waveform. This fact results in disadvantages such as occurrence of pulsation (ripple) or worse power factor, in an induction motor of such a type as carrying a current on the secondary side by a magnetic flux that the stator generates and producing a magnetic flux. However, concentrated winding stators have merits mainly from the viewpoint of productivity such as high mass production, small coil end, and high space factor.

Under the background as describe above, concentrated winding in stators of an induction motor has been taken into consideration. For example, the following technique is disclosed. In this related art, a stator consists of a plurality of stators axially divided; one divided stator is located being displaced only by an angle β circumferentially with respect to the other divided stator; and a coil of stator winding is wound individually on each teeth of the divided stators, so that the above-described negative-phase magnetic flux may be eliminated (see, for example, the Japanese Patent Publication (unexamined) No. 298578/1995 (e.g., claim 1)).

Nevertheless, in the technique disclosed in the Japanese Patent Publication (unexamined) No. 298578/1995, a coil end will be needed even at the axially central portion. Thus, one of the advantages of small coil end incidental to the concentrated winding is lost. Moreover, depending upon configuration, there are some cases of larger coil end than that of distributed winding type. That is, advantage of the concentrated winding type cannot always be exhibited. This problem remarkably comes out particularly in motors of a small stack thickness.

SUMMARY OF THE INVENTION

The present invention was made to solve the above-described problems of the prior art, and has an object of providing an electric rotating machine in which higher harmonics of magnetomotive force in low order close to fundamental wave are eliminated while keeping high productivity, being an advantage of the concentrated winding type, thus enabling the efficient operation.

An electric rotating machine according to the invention includes: a stator in which a coil is wound on a plurality of teeth in concentrated winding, and the coil is connected to a three-phase power supply; and a rotor disposed in opposition to the teeth of the stator; and in which a ratio between the number of poles and the number of slots of the stator is 1:3.

According to the electric rotating machine of the invention, three-phase concentrated winding, in which a ratio between the number of poles and the number of slots of the stator is 1:3, is employed. As a result, there is no higher harmonics of magnetomotive force in low order close to fundamental wave, and thus it is possible to operate an electric rotating machine efficiently. Furthermore, a stator of concentrated winding type enables to provide an electric rotating machine of high productivity of small coil end, high mass production, and high space factor.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
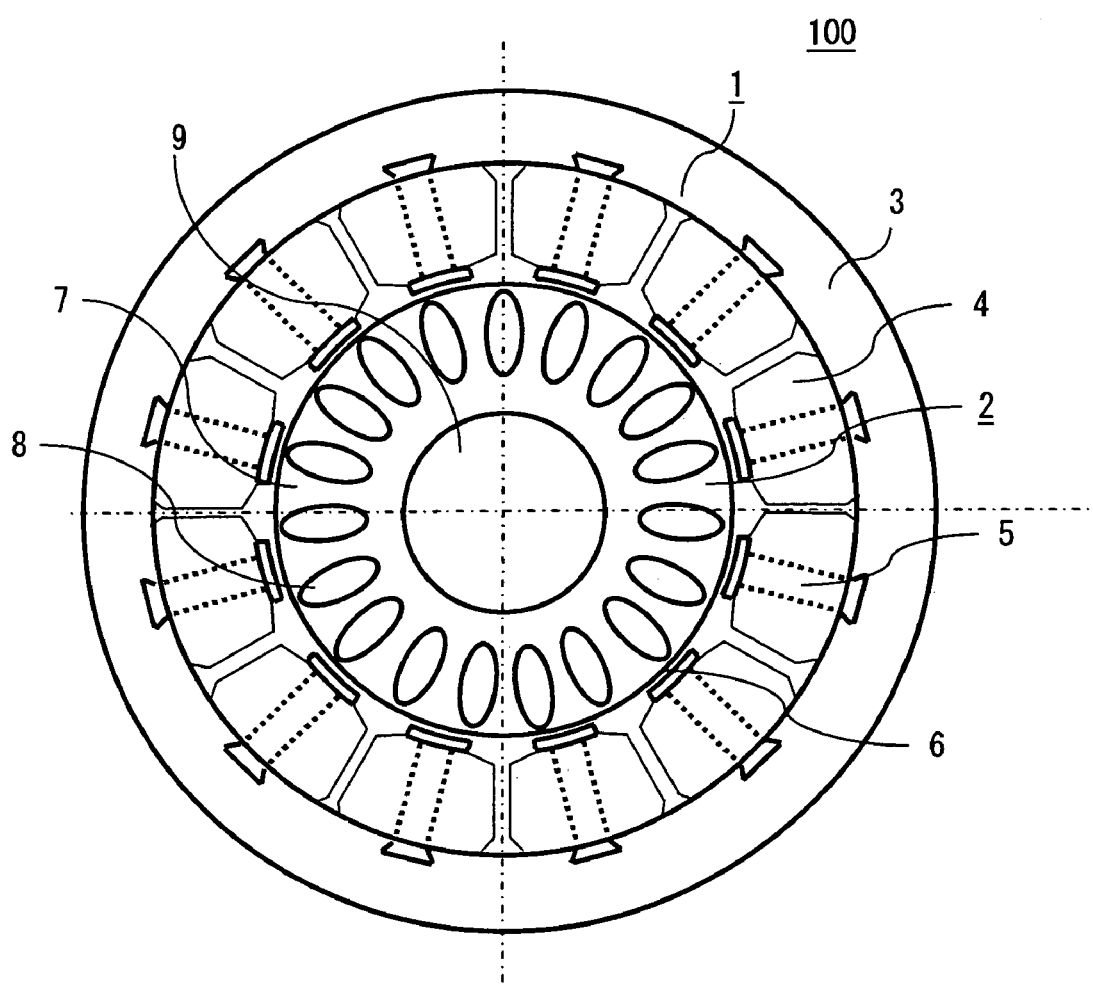
FIG. 1 is a cross sectional view showing an electric rotating machine of 12 slots at 4 poles according to a first preferred embodiment of the present invention.

Several preferred embodiments according to the present invention are hereinafter described referring to the drawings.

Embodiment 1

Figure 2:
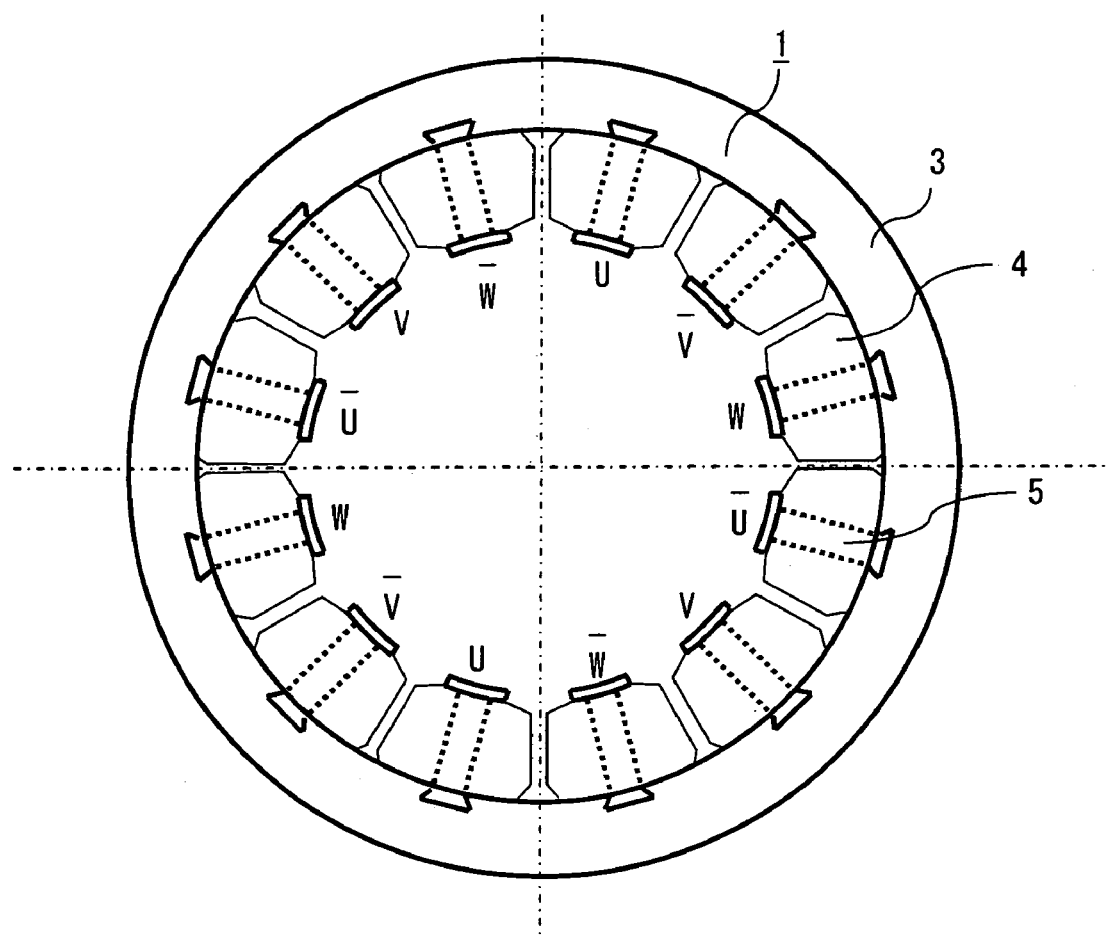
FIG. 2 is a cross sectional view showing a stator winding of the electric rotating machine of 12 slots at 4 poles according to the first embodiment of the invention.

FIG. 1 is a cross sectional view showing an electric rotating machine, particularly a three-phase concentrated winding induction motor according to a first embodiment of the invention. With reference to FIG. 1, a three-phase concentrated winding induction motor 100 is formed of a stator 1 and a rotor 2. The stator 1 is manufactured by integrally forming a core back 3 that is made by laminating, e.g., an electromagnetic steel plate, and portions in each of which a tooth 5 that is likewise made by laminating, e.g., an electromagnetic steel plate is wound with a coil 4 in a concentrated manner. As shown in FIG. 2, the coils 4 that are wound on each of the teeth 5 are connected to three-phase power supply (U-phase, V-phase, W-phase) respectively, and wound so as to produce a rotating magnetic field to be connected.

The rotor 2 includes a rotor core 7 that is made by laminating, e.g., an electromagnetic steel plate, and a secondary conductor 8 that is formed by, e.g., aluminum die-casting in secondary conductor-forming slots provided in the rotor core 7, and the rotor 2 is manufactured by insertion of a shaft 9. This secondary conductor 8 normally forms an end ring (not shown) at each of the two end portions in a stack thickness direction.

The stator 1 and the rotor 2 having been manufactured in such a manner are combined in one unit with a gap 6 therebetween to become a concentrated winding induction motor.

Now, a magnetomotive force, which is generated by a distributed winding stator generally for use in a three-phase induction motor, is considered. Table 1 shows higher harmonics of magnetomotive force generated by the distributed winding stator in the case where the number of slots in each phase at each pole is 3. This 3 number of slots in each phase at each pole means 18 slots of stator in case of 2 poles, and means 36 slots in case of 4 poles. Table 1 shows higher harmonics, letting fundamental wave 100%. It is understood from Table 1 that higher harmonics is small with respect to fundamental wave of the magnetomotive force, and it is slightly shown in the $5^{th}$, and $7^{th}$ orders.

TABLE 1

| Order | Ratio of Higher Harmonics to Fundamental Wave |
|---|---|
| Fundamental Wave | 100% |
| $2^{nd}$ order | 0% |
| $3^{rd}$ order | 0% |
| $4^{th}$ order | 0% |
| $5^{th}$ order | 4.7% |
| $6^{th}$ order | 0% |
| $7^{th}$ order | 2.8% |
| $8^{th}$ order | 0% |
| $9^{th}$ order | 0% |
| $10^{th}$ order | 0% |

Likewise, Table 2 shows higher harmonics of a magnetomotive force generated by a distributed winding stator in the case where the number of slots in each phase at each pole is 2 and 1. Results of Table 1 are shown again in Table 2. In any case, results are shown, letting fundamental wave of the magnetomotive force generated by respective stators 100%. As compared with Table 1, it is noted that although higher harmonics in the $5^{th}$, and $7^{th}$ orders are increased as the number of slots in each phase at each pole is decreased, the orders of high harmonics being generated are the same.

TABLE 2

| | Ratio of Higher Harmonics to Fundamental Wave | | |
|---|---|---|---|
| Order | The number of slots in each phase at each pole is 1 | The number of slots in each phase at each pole is 2 | The number of slots in each phase at each pole is 3 |
| Fundamental Wave | 100% | 100% | 100% |
| $2^{nd}$ order | 0% | 0% | 0% |
| $3^{rd}$ order | 0% | 0% | 0% |
| $4^{th}$ order | 0% | 0% | 0% |
| $5^{th}$ order | 20.6% | 5.5% | 4.7% |
| $6^{th}$ order | 0% | 0% | 0% |
| $7^{th}$ order | 15.2% | 4.1% | 2.8% |
| $8^{th}$ order | 0% | 0% | 0% |
| $9^{th}$ order | 0% | 0% | 0% |
| $10^{th}$ order | 0% | 0% | 0% |

A magnetomotive force generated by a concentrated winding stator and widely used in permanent magnet-type motors is considered. In permanent magnet-type motors, stators having a base unit of 3 slots at 2 poles are widely used. This base unit of 3 slots at 2 poles means 6 slots in case of 4 poles, and 9 slots in case of 6 poles. Table 3 shows higher harmonics of the magnetomotive force generated by a concentrated winding stator of a base unit of 3 slots at 2 poles. Note that magnetomotive forces are generated in, e.g., secondary or $4^{th}$ order that are not generated by the distributed stator shown in Table 2. This secondary magnetomotive force acts in a direction opposite to that of fundamental wave, and is referred to as a magnetomotive force of negative phase. Due to the fact that there is such negative-phase magnetomotive force in a frequency close to fundamental wave, an induction motor cannot rotate efficiently. There are main influences such as the occurrence of pulsation (ripple) of torque, or worse power factor.

TABLE 3

| Order | Ratio of Higher Harmonics to Fundamental Wave |
|---|---|
| Fundamental Wave | 100% |
| $2^{nd}$ order | 50.2% |
| $3^{rd}$ order | 0% |
| $4^{th}$ order | 25.5% |
| $5^{th}$ order | 20.6% |
| $6^{th}$ order | 0% |
| $7^{th}$ order | 15.2% |
| $8^{th}$ order | 13.6% |
| $9^{th}$ order | 0% |
| $10^{th}$ order | 11.4% |

Given these results, in induction motors including a distributed winding stator, since there is no magnetomotive force of negative phase in orders close to fundamental wave, an induction motor can be efficiently operated. On the other hand, in induction motors including a concentrated winding stator (of which base unit is 3 slots at 2 poles) widely used in permanent magnet-type motors, since there is a magnetomotive force of negative phase in orders close to fundamental wave, an induction motor cannot be operated efficiently.

Now, the magnetomotive force of a concentrated winding stator according to this first embodiment is described. A concentrated winding stator according to the first embodiment has a base unit of 3 slots at 1 pole, being different from a stator of 3 slots at 2 poles widely used in permanent magnet-type motors. That is, this basic unit means 6 slots in case of 2 poles, and 12 slots in case of 4 poles. Table 4 shows higher harmonics of a magnetomotive force of a concentrated winding stator having the base unit of 3 slots at 1 pole. In the same manner as in the foregoing tables, results are shown, letting fundamental wave 100%. While there is much higher harmonics of magnetomotive force in low order close to fundamental wave in stators of a base unit of 3 slots at 2 poles widely used in permanent magnet-type motors, there is no higher harmonics of magnetomotive force in low order close to fundamental wave in stators of a base unit of 3 slots at 1 pole according to the invention. Furthermore, since the magnetomotive force according to the invention is equivalent to that generated by a distributed winding stator, of which number of slots in each phase at each pole is 1, shown in FIG. 2, it is understood that the same performance as that of a distributed winding stator of the number of slots in each phase at each pole being 1, is obtained. Consequently, it is possible to cause an induction motor to rotate efficiently.

TABLE 4

| Order | Ratio of Higher Harmonics to Fundamental Wave |
|---|---|
| Fundamental Wave | 100% |
| $2^{nd}$ order | 0% |
| $3^{rd}$ order | 0% |
| $4^{th}$ order | 0% |
| $5^{th}$ order | 20.6% |
| $6^{th}$ order | 0% |
| $7^{th}$ order | 15.2% |
| $8^{th}$ order | 0% |
| $9^{th}$ order | 0% |
| $10^{th}$ order | 0% |

As described above, in the concentrated winding induction motor including a concentrated winding stator having a base unit of 3 slots at 1 pole, since there is no higher harmonics in orders close to fundamental wave, mainly power factor is improved, thus enabling the efficient operation of the induction motor. Moreover, the stator of concentrated winding makes it possible to obtain such advantages as higher mass production, smaller coil end, and higher space factor.

Figure 3:
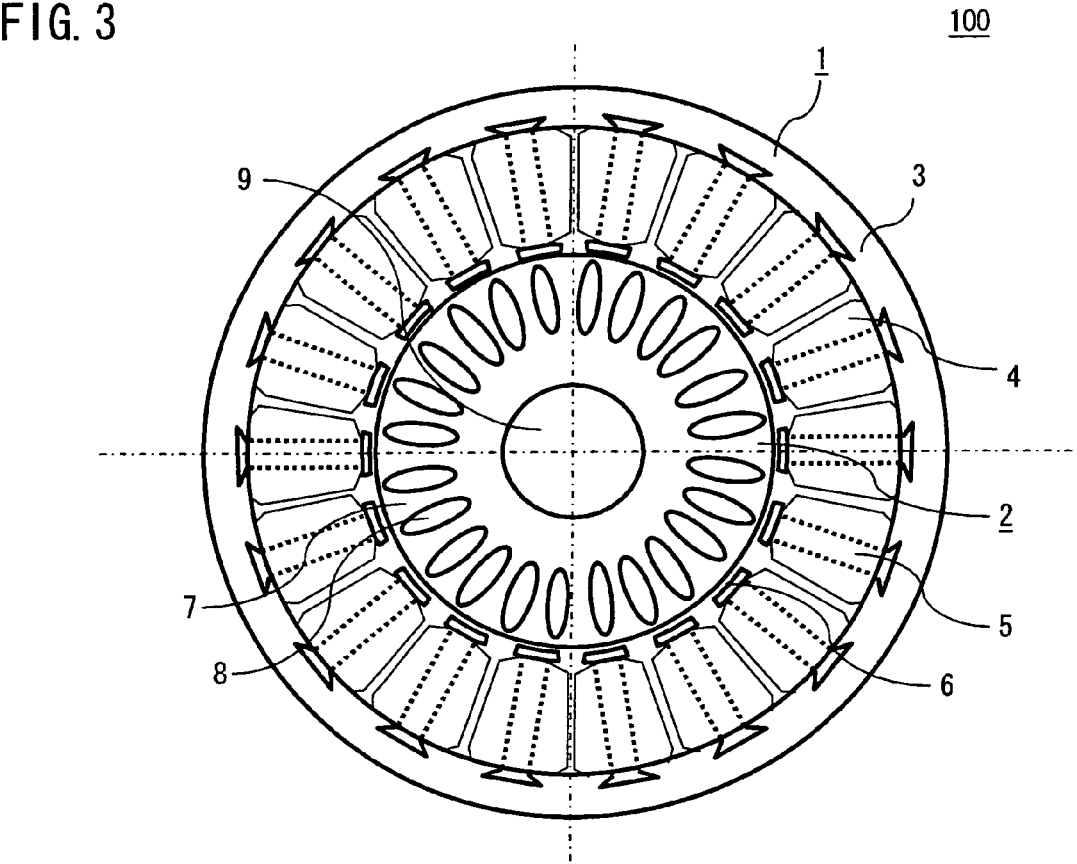
FIG. 3 is a cross sectional view showing an electric rotating machine of 18 slots at 6 poles according to the first embodiment of the invention.
Figure 4:
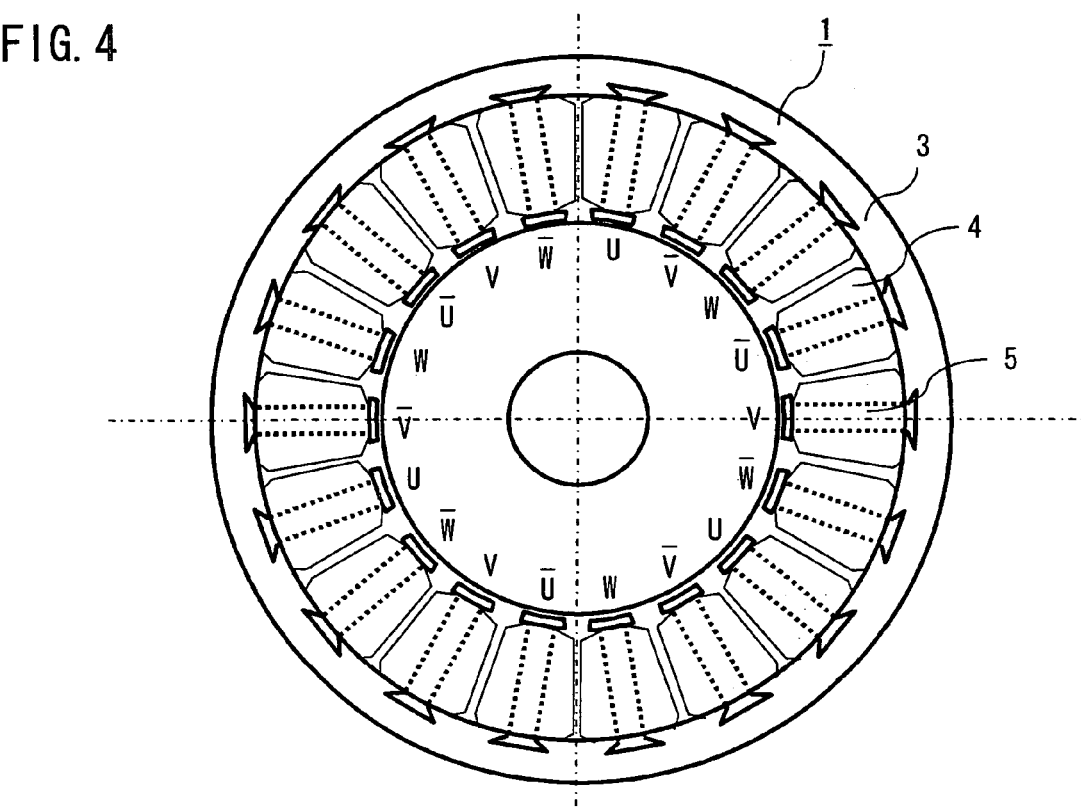
FIG. 4 is a cross sectional view showing a stator winding of the electric rotating machine of 18 slots at 6 poles according to the first embodiment of the invention.

In addition, FIGS. 1 and 2 show a concentrated winding induction motor of 12 slots at 4 poles according to the first embodiment, while FIGS. 3 and 4 showing a concentrated winding induction motor of 18 slots at 6 poles according to the first embodiment.

Embodiment 2

A resistance $R_1$ of a distributed winding induction machine can be calculated with the following expression (3) letting a length of a coil (copper wire) L and a sectional area of the coil $A_c$:

$$R_1 = \rho \frac{L}{A_C} \quad (3)$$

Letting a coil length per turn L1, the above L is obtained with the following expression (4) using the number of turns n and the number of slots Ns in each phase:

$$L = L_1 n N_s \quad (4)$$

Letting an external diameter of the stator $\Phi_d$, a coil diameter $0.8\Phi_d$ and the number of poles p, a coil length $L_E$ of one coil end portion of the distributed winding induction machine can be calculated with the following expression (5):

$$L_E = 0.8\pi \frac{\phi_d}{p} \times \frac{\pi}{2} \quad (5)$$

Letting an entire slot area $A_s$, and a space factor σ, a relation represented by the following expression (6) is established:

$$A_C = A_S \frac{\sigma}{N_S n} \quad (6)$$

As a result, letting core length of the stator LC, the resistance R1 is obtained with the following expression (7):

$$R_1 = \rho \times 2(L_C + L_E)nN_S \times \frac{N_S n}{A_S \sigma} = 2\rho \frac{n^2 N_S^2}{A_S \sigma}\left(L_C + \frac{0.4\pi^2}{p}\phi_d\right) \quad (7)$$

Letting a length required for connection 1, an entire length Ls of the distributed winding induction machine can be represented by the following expression (8):

$$L_S = L_C + 0.8\pi \frac{\phi_d}{p} + l \quad (8)$$

In the same manner, a resistance $R_2$ of a concentrated winding induction machine is now obtained. While the winding factor of the distributed winding induction machine being 1, the factor of the concentrated winding induction machine is 0.5. Accordingly, in order to obtain an equal torque with an equal current, it is necessary to double the number of turns per slot. On the other hand, it is supposed that the concentrated winding induction machine has a space factor twice as large as the distributed winding induction machine. Further, a coil length $L_E$ of one coil end portion of the concentrated winding induction machine can be obtained with the following expression (9):

$$L_E = 0.8\pi \frac{\phi_d}{N_S} \quad (9)$$

Taking the above into consideration, the resistance $R_2$ of the concentrated winding induction machine can be calculated with the following expression (10):

$$R_2 = \rho \times 2(L_C + L_E)2nN_S \times \frac{N_S \times 2n}{A_S \times 2\sigma} = 2\rho \frac{n^2 N_S^2}{A_S \sigma}\left(2L_C + \frac{1.6\pi}{3p}\phi_d\right) \quad (10)$$

where: $N_s = 3p$

Further, an entire length $L_s$ of the concentrated winding induction machine can be represented by the following expression (11):

$$L_S = L_C + 0.8\pi \frac{\phi_d}{N_S} + l = L_C + 0.8\pi \frac{\phi_d}{3p} + l \quad (11)$$

As a result of the above calculations, it is understood that advantages or disadvantages in comparison between the distributed winding induction machine and the concentrated winding induction machine depend on the stator core length and stator external diameter.

On the supposition that the stator core length $L_c$ is made equal in both distributed winding induction machine and concentrated winding induction machine, a full length of the concentrated winding induction machine becomes necessarily smaller being calculated on the above expression. Furthermore, the efficiency is improved more with the smaller resistance, so that a concentrated winding induction machine satisfying the following expression (12):

$$2\rho \frac{n^2 N_S^2}{A_S \sigma}\left(L_C + \frac{0.4\pi^2}{p}\phi_d\right) > 2\rho \frac{n^2 N_S^2}{A_S \sigma}\left(2L_C + \frac{1.6\pi}{3p}\phi_d\right) \quad (12)$$

The above expression (12) is rearranged into the following expression (13):

$$L_C < \frac{6\pi - 8}{15p}\pi\phi_d \quad (13)$$

That is, within a range of the expression (13), as compared with the distributed winding induction machine, the concentrated winding induction machine achieves more miniaturization and improvement in efficiency simultaneously.

As a result of the above calculation results, it may be said that, on condition of the stator core length being equal when an equal torque is obtained at an equal current, a full length of the concentrated winding induction machine becomes necessarily smaller. Accordingly, in the case that the full length of the induction machines is made equal, the stator core length of the concentrated winding induction machine can be made larger, so that a smaller current is sufficient for obtaining a torque equal to that of the distributed winding. Making the current small brings about reduction in copper loss, which eventually makes it possible to improve efficiency.

A difference between the full length of the concentrated winding induction machine and that of the distributed winding induction machine is obtained with the following expression (14):

$$L_C + 0.8\pi\frac{\phi_d}{p} + l - \left(L_C + 0.8\pi\frac{\phi_d}{3p} + l\right) = \frac{8\pi\phi_d}{15p} \quad (14)$$

That is, in the case of the induction machines being equal in full length, the stator core length of the concentrated winding induction machine can be established in the following expression (15):

$$L_C + \frac{8\pi\phi_d}{15p} \quad (15)$$

Accordingly, in order to obtain the same torque, the current of the concentrated winding induction machine that is obtained by multiplying the current of the distributed winding induction machine by a value obtained with the following expression (16) is sufficient:

$$\frac{L_C}{L_C + \frac{8\pi\phi_d}{15p}} \quad (16)$$

Taking the above facts into consideration, the concentrated winding induction machine can be miniaturized or improved in efficiency over the distributed winding induction machine, on condition that the following expression (17) is satisfied:

$$2\rho \frac{n^2 N_S^2}{A_S \sigma}\left(L_C + \frac{0.4\pi^2}{p}\phi_d\right) >$$
$$2\rho \frac{n^2 N_S^2}{A_S \sigma}\left(2\left(L_C + \frac{8\pi\phi_d}{15p}\right) + \frac{1.6\pi}{3p}\phi_d\right) \times \left(\frac{L_C}{L_C + \frac{8\pi\phi_d}{15p}}\right)^2 \quad (17)$$

The above expression (17) is rearranged into the following expression (18):

$$L_C + \frac{0.4\pi^2}{p}\phi_d > \left(2\left(L_C + \frac{8\pi\phi_d}{15p}\right) + \frac{1.6\pi}{3p}\phi_d\right) \times \left(\frac{L_C}{L_C + \frac{8\pi\phi_d}{15p}}\right)^2 \quad (18)$$

Figure 5:
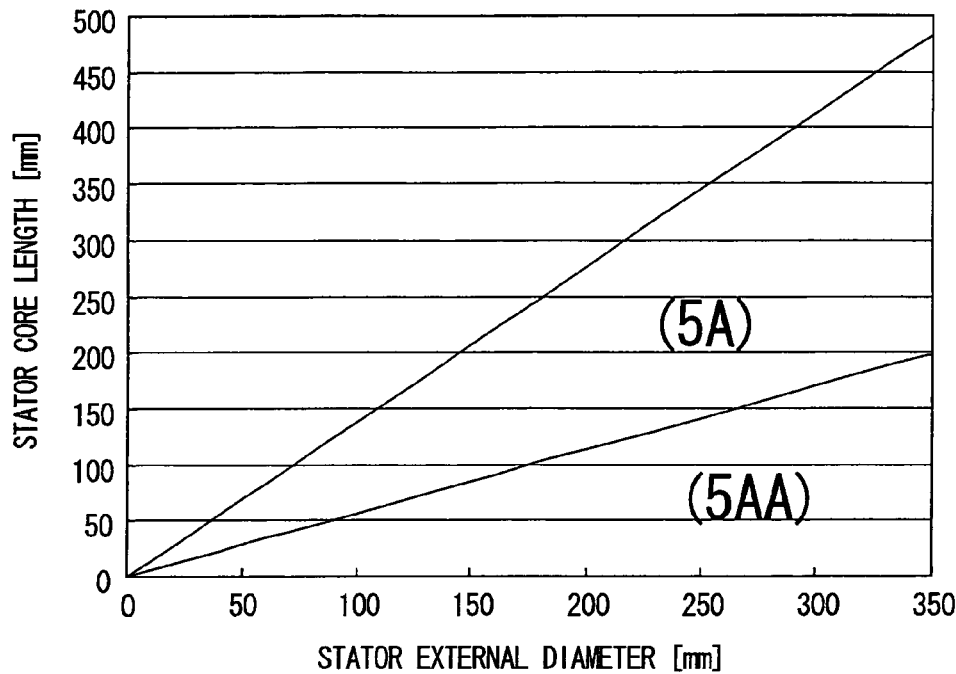
FIG. 5 is a diagram showing applicable range of the electric rotating machine of 12 slots at 4 poles according to a second embodiment of the invention.
Figure 6:
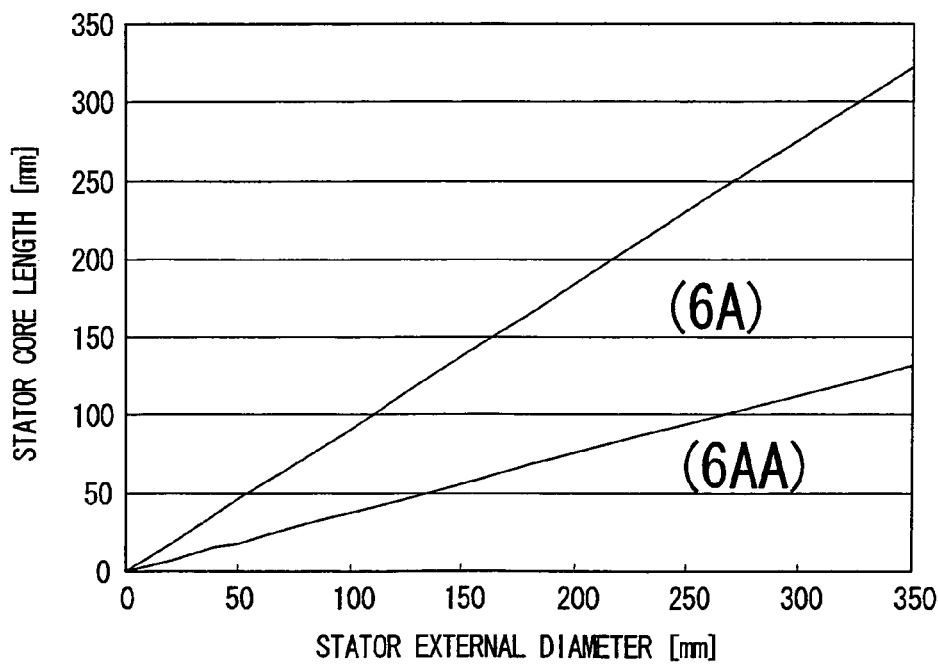
FIG. 6 is a diagram showing applicable range of the electric rotating machine of 18 slots at 6 poles according to a second embodiment of the invention.

Thus, according to Embodiment 2, in the arrangement of 12 slots at 4 poles, either improvement in efficiency or miniaturization is achieved within the range 5A shown in FIG. 5, and both improvement in efficiency and miniaturization are achieved within the range 5AA shown in FIG. 5. Likewise, in the arrangement of 18 slots at 6 poles, either improvement in efficiency or miniaturization is achieved within the range 6A shown in FIG. 6, and both improvement in efficiency and miniaturization are achieved within the range 6AA shown in FIG. 6.

Embodiment 3

As described in the foregoing first embodiment, in the concentrated winding induction motor including a concentrated winding stator having a base unit of 3 slots at 1 pole can be efficiently operated since there is no higher harmonics of magnetomotive force in the secondary or $4^{th}$ order, being different from a concentrated winding stator having a base unit of 3 slots at 2 poles widely used in permanent magnet-type motors.

It is to be noted that, in case of large higher harmonics of magnetomotive force in the $5^{th}$ or $7^{th}$ order, the pulsation (ripple) of torque is often increased. To cope with this, according to this second embodiment, the more efficient operation of a concentrated winding induction motor is achieved by decreasing higher harmonics of magnetomotive force in the $5^{th}$ order.

Higher harmonics of magnetomotive force in the $5^{th}$ order has a wavelength of $\frac{1}{5}$ that of fundamental wave. To be less affected by this $5^{th}$ higher harmonics of magnetomotive force, a secondary conductor 8 of the rotor 2 may be skewed. On the supposition of letting a wavelength of fundamental wave 360° at an electrical angle, a wavelength in the $5^{th}$ order is $\frac{1}{5}$ this 360°. Therefore, supposing that the secondary conductor 8 of the stator 2 is skewed at an electrical angle of plural times $\frac{1}{5}$ the foregoing 360°, the secondary conductor 8 of the rotor 2 may reduce the effect of higher harmonics of magnetomotive force in the $5^{th}$ order generated by the stator 1.

Figure 7:
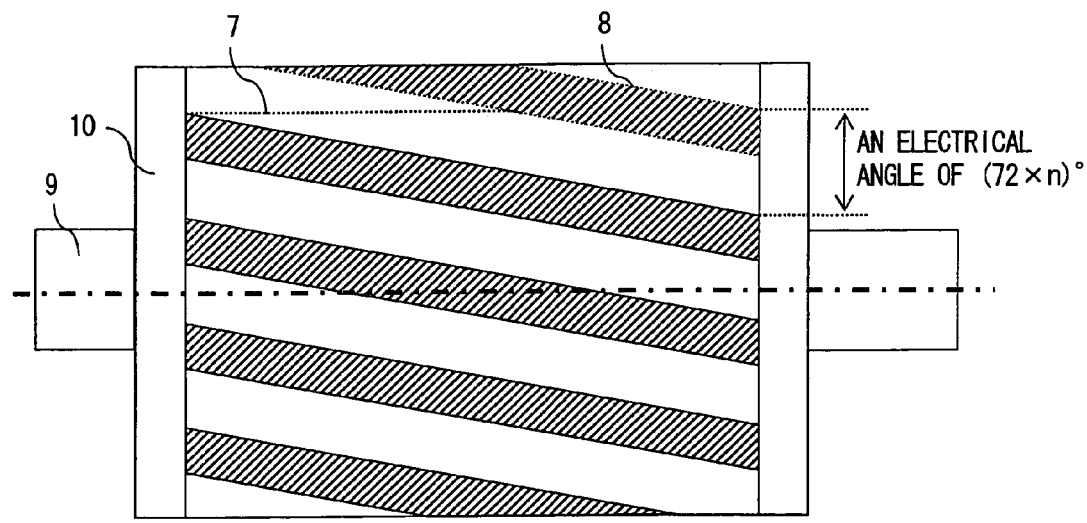
FIG. 7 is a longitudinal sectional view showing a rotor of an electric rotating machine according to a third embodiment of the invention.

FIG. 7 is a longitudinal sectional view of a rotor of a concentrated winding induction motor according to the second embodiment of the invention. In the drawing, reference numeral 7 designates a rotor core. Numeral 8 designates a secondary conductor. Numeral 9 designates a shaft. Numeral 10 designates an end ring. The secondary conductor 8 is axially skewed by a electrical angle θr with the following expression.

$$\theta r = 360/5 \times n = 72 \times n$$

where: θr is skew angle of rotor, and n is natural number.

Specifically, the secondary conductors 8 of the rotor 2 are skewed at an electrical angle of 72°, 144°, 216° . . . .

As described above, according to this second embodiment, by a secondary conductor of the rotor being skewed at an electrical angle of an integral multiple of 72°, it is possible to be less affected by higher harmonics of magnetomotive force in the 5th order generated by the stator. Consequently, it is possible to obtain a concentrated winding induction motor of small ripple.

Embodiment 4

Figure 8:
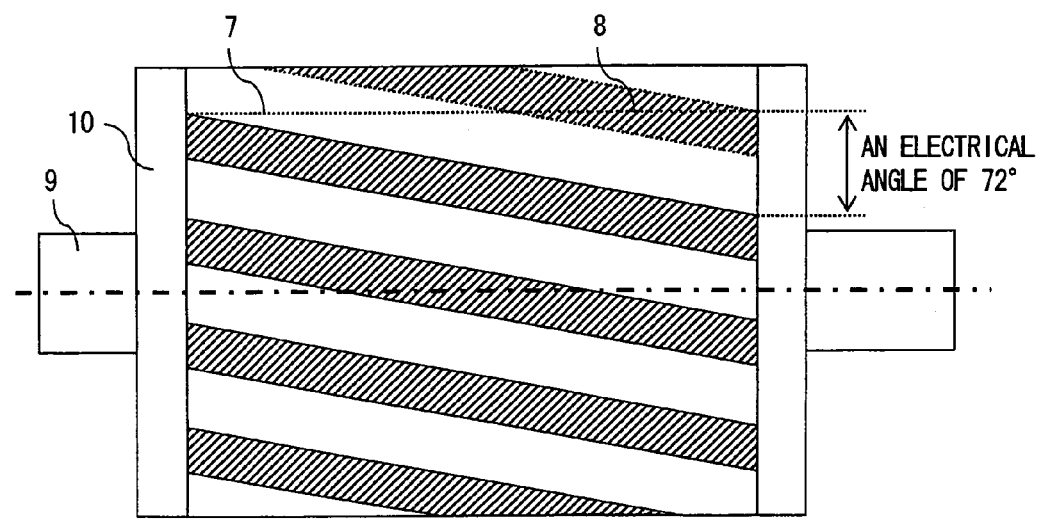
FIG. 8 is a longitudinal sectional view showing a rotor of an electric rotating machine according to a fourth embodiment of the invention.

In the third embodiment, there is a possibility that a larger torque is generated with the same current as a skew angle comes to be smaller, and therefore it is desirable that a skew angle is as small as possible. By a secondary conductor of the rotor being skewed at an electrical angle of 72° so as to be less affected by higher harmonics of magnetomotive force in the 5th order generated by the stator, it is possible to make torque larger, and to be reduce the effect (e.g., large ripple) of the 5th order magnetomotive force generated by the stator. FIG. 8 shows a longitudinal section of a rotor of a concentrated winding induction motor according to this third embodiment.

Embodiment 5

As described in the foregoing first embodiment, in the concentrated winding induction motor including a concentrated winding stator having a base unit of 3 slots at 1 pole can be efficiently operated since there is no higher harmonics of magnetomotive force in the secondary or 4th order, being different from a concentrated winding stator having a base unit of 3 slots at 2 poles widely used in the permanent magnet-type motors.

It is to be noted that in case of large higher harmonics of mangnetomotive force in the 5th or 7th order, the pulsation (ripple) of torque often becomes larger. To cope with this, in this fourth embodiment, by reducing higher harmonics of magnetomotive force in the 7th order, the more efficient operation of a concentrated winding induction motor is achieved.

The higher harmonics of magnetomotive force in the 7th order has a waveform of 7/1 that of fundamental wave. To be less affected by this 7th order of higher harmonics of magnetomotive force, it is preferable that a secondary conductor 8 of the rotor 2 is skewed. On the supposition of letting an electrical angle of a wavelength of fundamental wave 360° at an electrical angle, a wavelength in the 7th order is 1/7 this 360°. Therefore, supposing that a secondary conductor of the rotor is skewed at an electrical angle of plural times 1/7 the foregoing 360°, it is possible for the secondary conductor 8 of the rotor 2 to reduce the effect of 7th order of higher harmonics of magnetomotive force generated by the stator 1.

Figure 9:
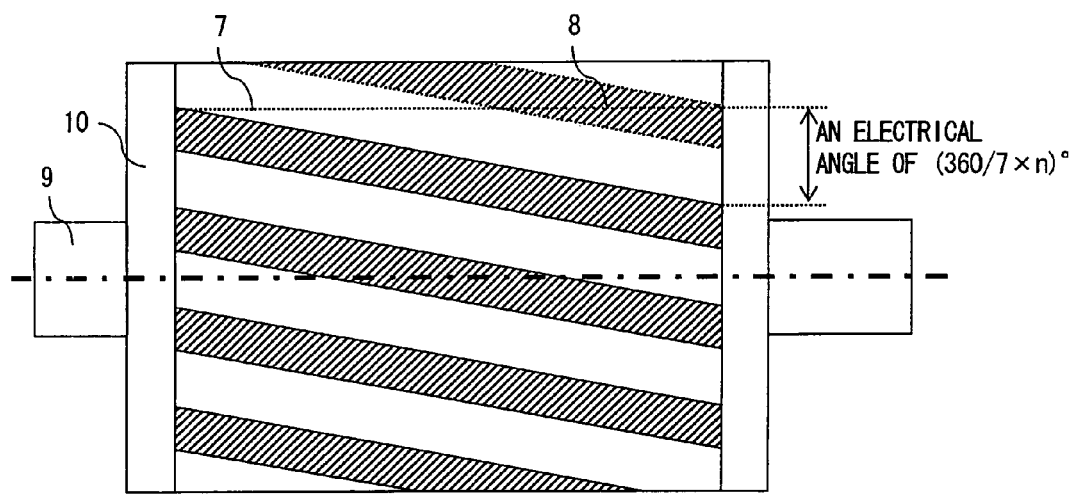
FIG. 9 is a longitudinal sectional view showing a rotor of an electric rotating machine according to a fifth embodiment of the invention.

FIG. 9 shows a longitudinal sectional view of a rotor of a concentrated winding induction motor according to the fifth embodiment of this invention. In the drawing, reference numeral 7 designates a rotor core. Numeral 8 designates a secondary conductor. Numeral 9 designates a shaft. Numeral 10 designates an end ring. The secondary conductor 8 is axially skewed at a electrical angle θr1 with the following expression:

$$\theta r1 = 360/7 \times n$$

where: θr1 is skew angel of rotor, and n is natural number.

Specifically, the secondary conductors 8 of the rotor 2 are skewed at an electrical angle of 51.4°, 102.9°, 154.3° . . . .

As described above, according to this fourth embodiment, by a secondary conductor of the rotor being skewed at an electrical angle of an integral multiple of (360/7)°, it is possible to reduce the effect of higher harmonics of magnetomotive force in the 7th order generated by the stator. Consequently, it is possible to obtain a concentrated winding induction motor of small ripple.

Embodiment 6

Figure 10:
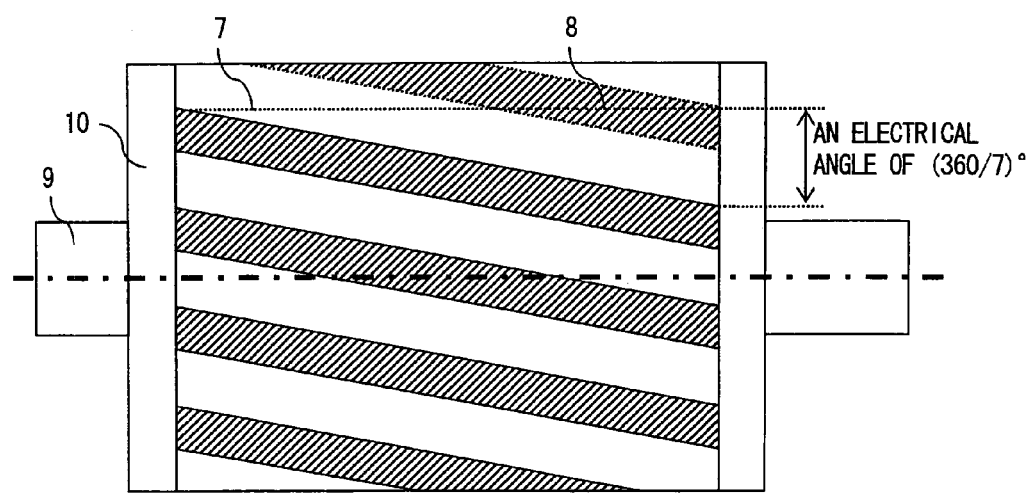
FIG. 10 is a longitudinal sectional view showing a rotor of an electric rotating machine according to a sixth embodiment of the invention.

In the foregoing fifth embodiment, there is a possibility that a larger torque is generated with the same current as a skew angle comes to be smaller, and therefore it is desirable that a skew angle is as small as possible. By a secondary conductor 8 of the rotor 2 being skewed at an electrical angle of (360/7)° so as to be less affected by higher harmonics of magnetomotive force in the 7th order generated by the rotor, it is possible to make torque larger, and to reduce the effect (e.g., large ripple) of the 7th order magnetomotive force generated by the stator 1. FIG. 10 shows a longitudinal sectional view of a rotor of a concentrated winding induction motor according to this fifth embodiment.

Embodiment 7

There are finite slots in a stator 1, so that a slot higher harmonic magnetic flux is generated. This slot higher harmonic magnetic flux is linked to the rotor 2, which results in secondary copper loss of higher harmonics or iron loss of higher harmonics. The higher harmonic secondary copper loss comes to be the minimum when the number of slots of the rotor 2 is n times the number of slots of the stator 1 (n is a natural number), and comes to be the maximum when the number of slots of the rotor 2 is (n−0.5) times the number of slots of the stator 1. On the contrary, the higher harmonic iron loss comes to be the maximum when the number of slots of the rotor 2 is n times the number of slots of the stator 1, and comes to be the minimum when the number of slots of the rotor 2 is (n−0.5) times the number of slots of the stator 1. Accordingly, it is necessary to minimize these higher harmonic losses.

Figure 11:
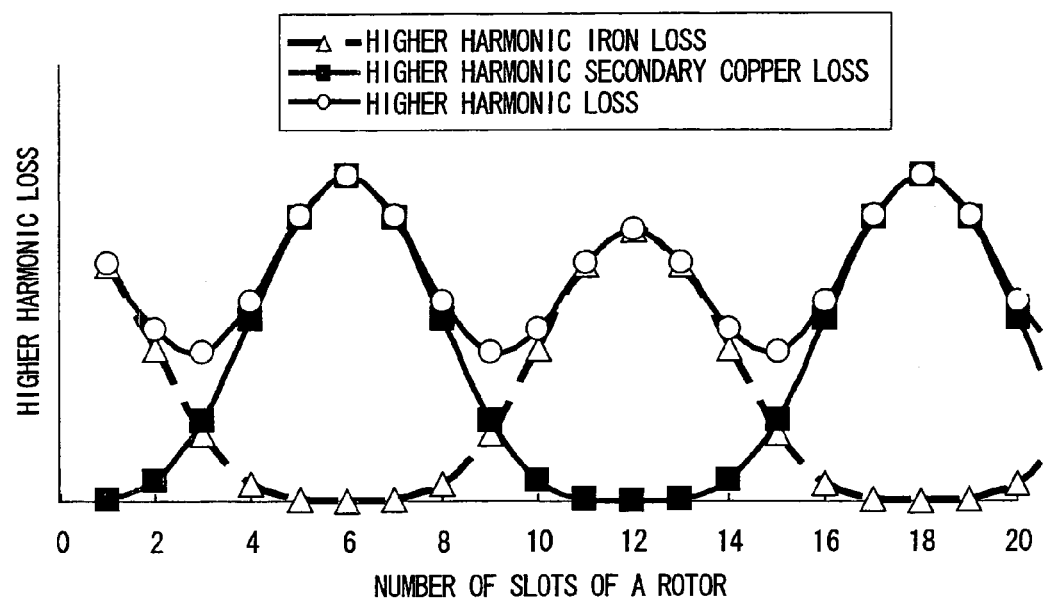
FIG. 11 is a schematic diagram showing higher harmonic loss of an electric rotating machine according to a seventh embodiment of the invention.

FIG. 11 is a schematic diagram of higher harmonic losses of an electric rotating machine, and shows a three-phase concentrated winding induction motor of four poles as an example. Further, the number of slots of a stator 1 is 12 slots. With reference to FIG. 11, ■ indicates higher harmonic secondary copper loss, △ indicates higher harmonic iron loss, and ○ indicates higher harmonic loss. In addition, generally to minimize higher harmonic loss, the maximum value of higher harmonic iron loss and the maximum value of higher harmonic secondary copper loss are normally designed to be substantially at the same level. Due to change in the number of slots of the rotor 2, higher harmonic loss, being a sum of a higher harmonic secondary copper loss and a higher harmonic iron loss is increased or decreased. With reference to FIG. 11, although the maximum of higher harmonic secondary copper losses is larger than the maximum of higher harmonic iron losses, the magnitude correlation therebetween changes based on various elements such as grades or frequencies of a rotor core 7. However, it is to be note that the minimum values are positioned in the middle of respective maximum values of higher harmonic secondary copper loss and higher harmonic iron loss.

That is, higher harmonic loss is found to be the minimum in the vicinity where the number of slots of a rotor 2 is substantially (0.5n+0.25) times the number of slots of a stator 1. Thus, letting the number of slots of the stator 1 Ns, and the number of slots of the rotor 2 Nr, higher harmonic loss is found to be the minimum when satisfying Ns×(0.5n+0.25)−1≦Nr≦Ns×(0.5n+0.25)+1, where: Nr and Nn are natural numbers.

Furthermore, when the number of slots of a rotor is to be a natural number most close to Ns×(0.5n+0.25), higher harmonic loss comes to be the minimum.

Moreover, in the case where the number of poles of a stator 1 is 4, by letting the number of slots of a rotor 2 9 or 15, higher harmonic loss of FIG. 11 comes to be the minimum.

Although the foregoing embodiments are described taking an induction motor as example, the same advantages are achieved in case of any other electric rotating machine such as induction generator or the like that includes the same structure as those described above.

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. An induction machine comprising:
a stator having a stator core including plural poles and plural slots separated by teeth, in which a coil for one phase is wound on each of the teeth provided on the stator core in concentrated winding, and the coil is connected to a three-phase power supply; and
a rotor disposed in opposition to said teeth of said stator;
wherein a ratio between the number of poles and the number of slots of the stator is 1:3, and plural coils are wound on the successive teeth of the stator core in a repeated sequence of U, $\overline{V}$, W, $\overline{U}$, V and $\overline{W}$ phases, the $\overline{U}$-, $\overline{V}$- and $\overline{W}$-phase coils being wound in directions opposite to winding directions of the U-, V- and W-phase coils, respectively.

2. The electric rotating machine according to claim 1, wherein a relation between a stator core length $L_c$ and an external diameter $\Phi_d$ of the stator satisfies the following expression (1):

$$L_C + \frac{0.4\pi^2}{p}\phi > \left(2\left(L_C + \frac{8\pi\phi_d}{15p}\right) + \frac{1.6\pi}{3p}\phi_d\right) \times \left(\frac{L_C}{L_C + \frac{8\pi\phi_d}{15p}}\right)^2 \quad (1)$$

where: p is the number of poles of the stator.

3. The electric rotating machine according to claim 1, wherein a relation between a stator core length $L_c$ and an external diameter $\Phi_d$ of the stator satisfies the following expression (2):

$$L_C < \frac{6\pi - 8}{15p}\pi\phi_d \quad (2)$$

where: p is the number of poles of the stator.

4. The electric rotating machine according to claim 1, wherein a secondary conductor that is formed in a slot of the rotor is axially skewed at an electrical angle of approximately (72×n)°(where: n is a natural number).

5. The electric rotating machine according to claim 1, wherein a secondary conductor that is formed in a slot of the rotor is axially skewed at an electrical angle of approximately 72°.

6. The electric rotating machine according to claim 1, wherein a secondary conductor that is formed in a slot of the rotor is axially skewed at an electrical angle of approximately (360/17×n)°(where: n is a natural number).

7. The electric rotating machine according to claim 1, wherein a secondary conductor that is formed in a slot of the rotor is axially skewed at an electrical angle of approximately (360/7)°.

8. The electric rotating machine according to claim 1, wherein in the case of letting the number of slots of the stator Ns and the number of slots of the rotor Nr, Ns×(0.5n+0.25)−1≦Nr≦Ns×(0.5n+0.25)+1.

9. The electric rotating machine according to claim 1, wherein in the case of letting the number of slots of the stator Ns, the number of slots of the rotor Nr is a natural number most close to Ns×(0.5n+0.25).

10. The electric rotating machine according to claim 1, wherein in the case where the number of poles of the stator is four, the number of slots of the rotor is 9 or 15.

* * * * *